(12) United States Patent
Matthew et al.

(10) Patent No.: US 6,283,367 B1
(45) Date of Patent: Sep. 4, 2001

(54) IC CARD READER WITH SYNTHESIZED VOICE OUTPUT

(75) Inventors: Kerry Ray Matthew; Paul Waihung Chau, both of Marlborough, MA (US)

(73) Assignee: Info Telecom, Cedex (FR)

( * ) Notice: Subject to any disclaimer, the term of this patent is extended or adjusted under 35 U.S.C. 154(b) by 910 days.

(21) Appl. No.: 08/536,163

(22) Filed: Sep. 29, 1995

(51) Int. Cl.[7] ........................................................ G06K 5/00
(52) U.S. Cl. .......................... 235/380; 235/379; 235/441
(58) Field of Search .................... 235/380, 379, 235/382, 375, 492, 487, 441

(56) References Cited

U.S. PATENT DOCUMENTS

| | | | |
|---|---|---|---|
| 4,634,845 | * 1/1987 | Hare et al. | 235/380 |
| 4,779,138 | * 10/1988 | Nomura et al. | 358/236 |
| 4,837,422 | * 6/1989 | Dethzoff et al. | 235/380 |
| 4,904,853 | * 2/1990 | Yokokawa | 235/487 |
| 4,961,229 | * 10/1990 | Takahashi | 235/380 X |
| 4,964,167 | 10/1990 | Kunizawa et al. | 351/52 |
| 5,015,830 | * 5/1991 | Masuzawa et al. | 235/441 |
| 5,146,493 | * 9/1992 | Kiguchi et al. | 379/357 |
| 5,247,164 | * 9/1993 | Takahashi | 235/492 |
| 5,252,815 | * 10/1993 | Pernet | 235/441 |
| 5,272,319 | * 12/1993 | Rey | 235/379 |
| 5,361,173 | * 11/1994 | Ishii et al. | 360/27 |
| 5,379,153 | * 1/1995 | Ishii et al. | 360/27 |
| 5,384,834 | * 1/1995 | Sato et al. | 379/88 |
| 5,394,332 | * 2/1995 | Kuwahara et al. | 364/449 |
| 5,455,851 | * 10/1995 | Chaco et al. | 379/38 |
| 5,521,362 | * 5/1996 | Powers | 235/380 |

FOREIGN PATENT DOCUMENTS

| | | |
|---|---|---|
| 63-76046 | 4/1988 | (JP) . |
| 6-890098 | 3/1994 | (JP) . |

* cited by examiner

*Primary Examiner*—Karl D. Frech
*Assistant Examiner*—Jared Fureman
(74) *Attorney, Agent, or Firm*—Rabin & Champagne, PC

(57) ABSTRACT

An IC card reader that can output data in an audio form. The IC card reader includes a small portable case in which an IC card can be inserted. A microcontroller powered by a battery within the case reads the stored data from the IC card and encodes the read data into a series of voice commands. A voice synthesizer circuit produces a synthetic speech signal from the encoded data. Thus, in use of the IC card reader, when a button is depressed to close a switch, the microcontroller is caused to interrogate the card so that the data stored on the card is read into the microcontroller. The microcomputer produces a synthetic speech signal that is amplified by the amplifier and output by the speaker as synthetic speech which can be heard by the user by holding the card reader with the speaker against the user's ear.

10 Claims, 4 Drawing Sheets

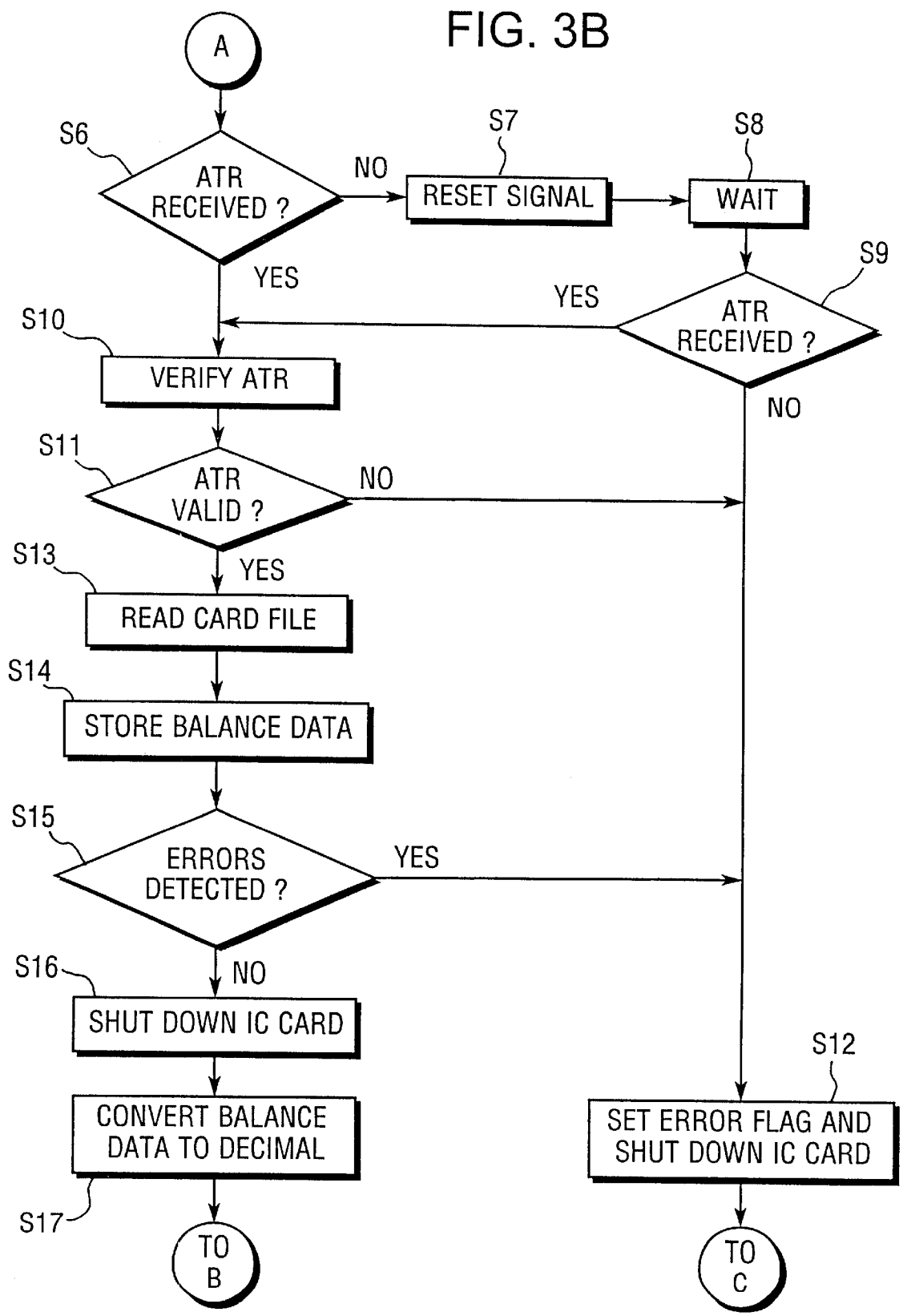

IC CARD READER WITH SYNTHESIZED VOICE OUTPUT

FIELD OF THE INVENTION

The invention relates to IC card (smart card) readers, and more particularly, to a portable, hand-held IC card reader that provides an audio output.

DESCRIPTION OF THE RELATED ART

IC cards are cards, typically the size of a credit card, that contain integrated circuitry including an erasable and programmable ROM (EPROM) permitting the storage of data that can be read out and changed. The most common use of IC cards has been as debit cards. As debit cards, IC cards have had several applications.

IC cards have been used by subway riders who purchase a card with a desired value programmed into the card, with the stored value decreasing by an amount equal to the fare each time the card is used to gain access to the subway system. Other cards are used in vending machines, allowing users to carry one card to use for all their vending purchases instead of needing change or single dollars. The programmed amount on the card is reduced each time a purchase is made. Prepaid telephone IC cards are also popular.

IC cards have also been used to make purchases from merchants. Thus, when a person desires to make a purchase from a merchant, the merchant processes the purchaser's debit card to deduct an amount from a balance stored on the card and add the same to his own bank balance. The card always stores the current credit balance, which can be increased, for example, while inserted in a device that is electronically coupled to the user's bank account and decreased, for example, while inserted in a device that is electronically coupled to a merchant's bank account.

Furthermore, IC cards that do not store cash information can also be used. For example, IC cards have been used as identification cards and drivers' licenses that can store personal or medical data, etc.

One disadvantage of IC cards is that the user has no easy way to determine the data that is stored on the card unless he or she remembers it. If the user forgets, then he or she must normally go to a machine that accepts such cards to find out what is stored on the card (e.g., the amount of money that is left on the card).

In order for the card holder to recall a balance amount that is on the card or to verify that the proper amount was deducted from his or her card in any particular transaction, stationary and portable IC card readers have been developed, which read data from the cards and provide a visual output on a visual display such as a CRT or LCD or LED display. Such readers are known, for example, in U.S. Pat. No. 5,015,830 to Masuzawa et al, U.S. Pat. No. 5,272,319 to Rey, and U.S. Pat. Nos. 5,247,164 and 4,406,064 to Takahashi. Those devices require a user to view and read the information. Such IC card readers can be difficult for anyone to read in low light situations if the visual display is an LCD, and impossible for sight impaired persons to read with any type of visual display.

Sight impaired persons have a problem with cash transactions, since such persons do not have a foolproof way of determining the denominations of paper currency. The problem also exists for using the conventional IC card as a debit card for transactions, since again, in the example of a purchase from a merchant using the debit card, the sight impaired person has no way of verifying the actual amount of any deduction processed by the merchant.

SUMMARY OF THE INVENTION

An object of the invention is to provide a means by which an IC card holder, particularly a sight impaired person, can verify the contents of, and changes in, data stored on the IC card. It is another object of the invention to provide an IC card reader which can output data in a form other than visual and that can be easily understood by a visually impaired person.

These objectives are met according to the invention by an IC card reader that can output data in an audio form. The IC card reader according to the invention includes a small case in which are provided means for receiving an IC card having data stored thereon, means for reading the stored data and means for encoding the read data into a series of voice commands. In a preferred embodiment, such means are provided by a microcontroller. Also provided in the case is a voice synthesizer circuit which is responsive to the encoded data for producing a synthetic speech signal. An audio amplifier within the case is connected to the voice synthesizer circuit for amplifying the synthetic speech signal. A miniature speaker internal to the case is responsive to the synthetic speech signal for outputting an audio signal corresponding to the stored data through small holes in a front face of the case.

A membrane switch within the case is closed by a push button on the front face of the case to electrically connect the microcontroller to the card. Thus, in use of the IC card reader, by holding the button down to close the switch, the microcontroller is caused to interrogate the card so that the data stored on the card is read into the microcontroller. The microcomputer produces a synthetic speech signal that is amplified by the amplifier and output by the speaker as synthetic speech which can be heard by the user while holding the card reader with the speaker against the ear.

Thus, if the card serves as a debit card, then upon its use in a transaction, for example, to make a purchase or increase the balance on the card, the user may insert the card in the card reader to determine the balance stored in the card by voice output. By inserting the card in the card reader both before and after the transaction, the user can easily determine the actual amount of any credit to or debit from the card balance.

BRIEF DESCRIPTION OF THE DRAWINGS

These and other aspects of the invention may be better understood from the following detailed description of a preferred embodiment with reference to accompanying drawings in which

FIGS. 3A, 3B, 3C and 3D are flow charts illustrating the operation of the IC card reader.

DETAILED DESCRIPTION OF THE PREFERRED EMBODIMENT

Figure 1:
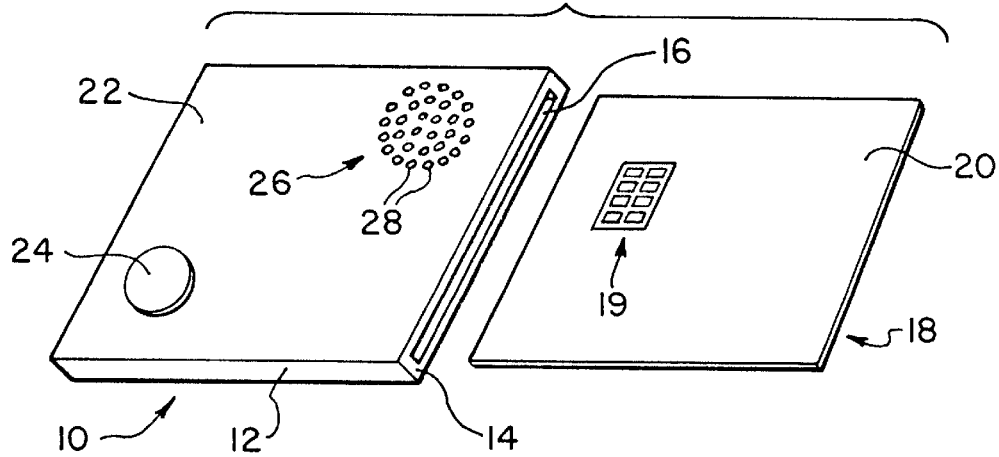
FIG. 1 is a perspective view of the IC card reader according to the invention.

Referring first to FIG. 1, an embodiment 10 of the IC card reader according to the invention includes a small rectangular case 12 suitably formed of hard plastic and of a size convenient to be placed in a shirt or jacket pocket, for example 3.75 inches long, 2.5 inches wide and 0.25 inch thick. The case is closed on all sides except an end 14 having a slot 16 into which an IC card 18 of conventional design may be inserted. As is well known by those skilled in the art, a conventional IC card has an erasable programmable ROM (not shown) and associated circuitry such as a microprocessor (not shown). These electrical components are embedded in the IC card and communicate with the outside by means such as an IC contact area 19. When the IC card is inserted in the case 12 with its top face 20 facing upward, the contacts of contact area 19 make electrical contact with circuitry of the reader as will be explained in detail below.

The top face 22 of the case 12 has a push button 24 of a membrane switch, and a region 26 with small holes 28. The holes 28 communicate with a miniature speaker (not shown in FIG. 1) that outputs synthetic speech indicative of data on the card 18, when the button 24 is depressed and held, as will be described below.

Figure 2:
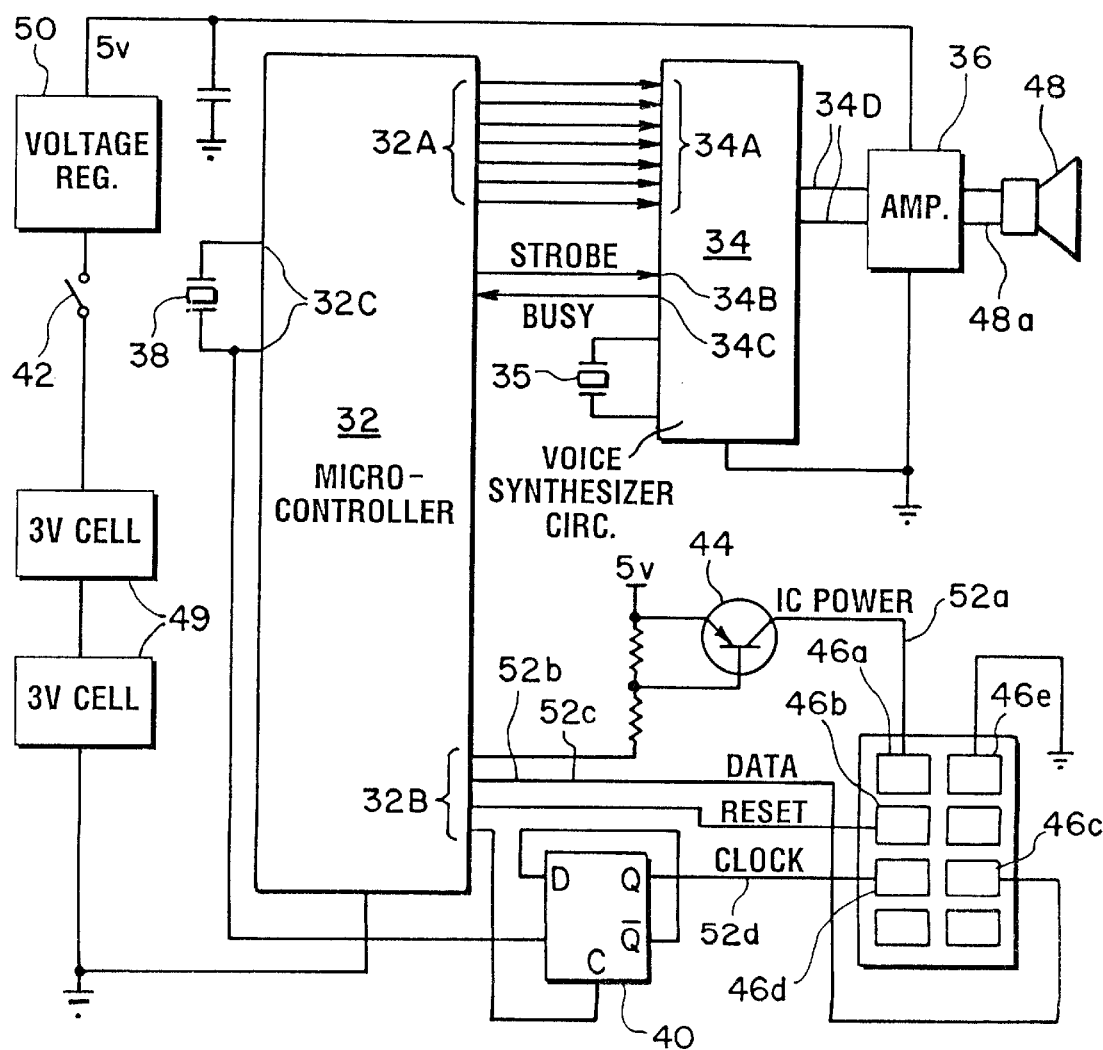
FIG. 2 is a block circuit diagram of the IC card reader of the invention.

Referring next to FIG. 2, within the case 12 is a substrate (not shown) on which is provided a microcontroller 32 having a seven-terminal audio address port (MP) 32A, an IC card port 32B and two resonator input/output terminals 32C and other terminals as shown, and a voice synthesizer circuit 34 having a seven-terminal address input port 34A, a strobe input terminal 34B, a busy output terminal 34C and two audio output terminals 34D. Two additional terminals are provided for connecting a crystal 35. The microcontroller suitably is an MCHCO5 (available from Motorola, Inc.) or equivalent. The voice synthesizer circuit 34 suitably is an MSM6374 (available from Oki Semiconductor, Inc.). Also provided on the substrate are an audio amplifier 36 connected to the audio output terminals 34D, a ceramic resonator 38 connected to the terminals 32C, a flip-flop 40 connected to the IC card port 32B and the resonator 38, a membrane switch 42, a transistor 44 which serves as a card power switch, an IC card connector 46, connectors (not shown) for receiving 3-volt cells 49, and a 5-volt low dropout voltage regulator 50. The IC card connector 46 has eight card connector pads (according to International Standard Organization (ISO) 7816). These include pads 46a, 46b, 46c, 46d and 46e that are connected as will be described below, and three additional (unnumbered) pads not utilized in the present embodiment. Also provided within the case 12 is a miniature speaker 48 connected to the amplifier 36 by conductive lines 48a. The microcontroller 32, voice synthesis circuit 34 and audio amplifier 36 are powered by the cells 49, through the membrane switch 42 and the 5-volt voltage regulator 50.

A conductive line 52a connects the collector of transistor 44 to pad 46a in order to supply power to the IC card 18 from the battery cells 49 through the switch 44 and voltage regulator 50, in response to a signal from the microcontroller 32. A conductive line 52b carries an IC card reset signal from the microcontroller 32 to pad 46b and thence to the IC card. A line 52c carries serial data from the IC card 18 to the microcontroller 32 via pad 46c. A conductive line 52d carries a card clock signal having half the frequency of ceramic resonator 38 from the flip flop 40 to pad 46d and thence the IC card 18 in response to a signal from the microcontroller 32. Finally, a conductive pad 46e is connected to ground.

The voice synthesizer circuit 34 stores various sounds in its internal memory, including syllables that make up all numbers zero to nine and a beep sound. When an address is output by the microcontroller 32 from its MP port 32A and presented to the synthesizer circuit 34 via its address input port 34A, and the strobe input terminal 34B is activated, the synthesizer circuit 34 produces an analog audio signal corresponding to the location in the memory that the address references. The audio analog signal is output to the amplifier 36, which in turn drives the speaker 48. During the audio output, the synthesizer circuit 34 indicates that it is performing audio conversion by issuing a busy signal back to the microcontroller 32 via the synthesizer circuit's busy output terminal 34C.

Figure 3A:
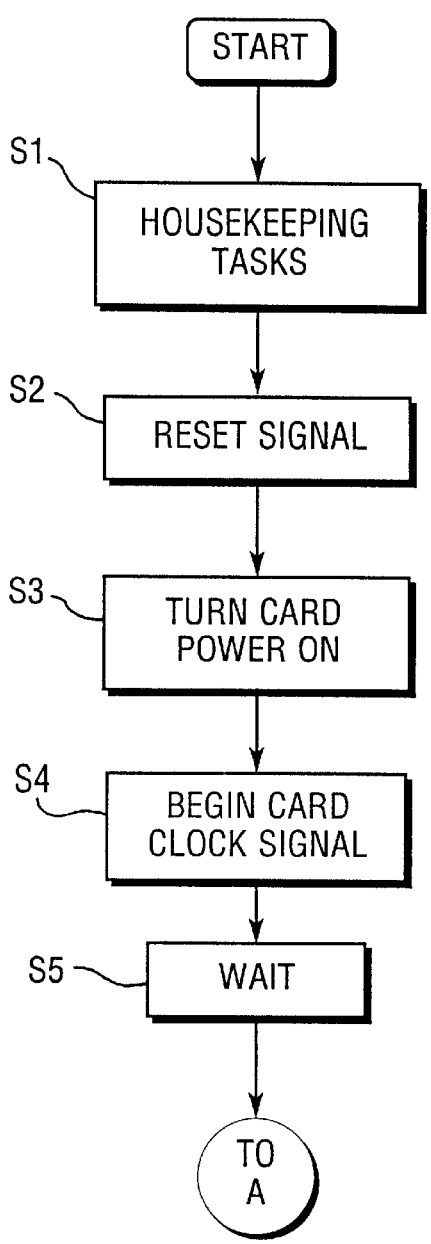

Referring also to FIG. 3A, the IC card reader 10 operates in the following manner. Upon insertion of the card 18 into the slot 16 of the reader 10, the IC contact area 19 of the card makes physical electrical contact with the contact pads 46a–46e of the IC card connector 46. The user then holds the IC card reader close to his or her ear so as to be able to hear an audio output from the miniature speaker 48, and presses the button 24 so that the battery power switch 42 is closed, thereby providing DC power to the microcontroller 32, voice synthesizer circuit 34 and amplifier 36. The microcontroller 32 then establishes communication with the IC card 18, performs initial housekeeping tasks (step S1) and resets the IC card reset line 52b to a logic 0 (step S2).

Next, the microcontroller 32 turns the transistor 44 ON to provide power to the card 18 (step S3). After a short pause, to ensure that the IC card VCC is established, the microcontroller enables flip-flop 40 by discontinuing a clear signal, whereupon flip-flop 40 begins to provide a clock signal to the IC card (step S4). This initiates a cold reset process. The microcontroller 32 monitors the card data line 46c and waits a predetermined number of clock cycles, for example 40,000 clock cycles, for an initial response from the IC card 18 (step S5).

Turning next to FIG. 4B, the initial response is referred to by International Standard Organization (ISO) 7816 as an answer to reset (ATR). If an ATR signal is not received within the predetermined number (40,000) of clock cycles (step S6), the microcontroller sets the IC card reset line 52b high to initiate a warm reset (step S7). The microcontroller 32 then again waits a predetermined number of clock cycles (for example 40,000) (step S8), while continuing to monitor the data line 52c for the ATR signal from the IC card. Another check is made at step S9 to determine whether the ATR signal has been received. If the ATR signal has been received ("Yes" at step S6 or step S9), a verification procedure is conducted at step S10. If the ATR signal was invalid ("No" at step S11), or if the waiting time expired without any ATR signal ("No" at step S9), an error flag is set within an internal RAM (not shown) in the microcontroller 32 and the microcontroller shuts down the IC card by disabling the card clock signal at the flip-flop 40 and turning transistor 44 OFF to stop providing power to the IC card (step S12).

Assuming that a valid ATR signal has been received within the prescribed waiting period ("Yes" at step S11), the microcontroller requests card balance data from a file inside the IC card (step S13). This can be done in a number of ways, depending on the details of the IC card. In the preferred embodiment, the microcontroller 32 sends a command to the IC card on the data line 52c and waits for a response. Data is then sent from the IC card to the microcontroller on the data line 52c and the received data is temporarily stored in the internal RAM (step S14). The microcontroller 32 then checks the data for parity and time-out errors (step S15). If any errors are detected, the process goes to step S12; that is, the microcontroller sets an error flag in its memory and discontinues the card clock signal and turns the transistor 44 OFF.

If no error is detected, microcontroller 32 shuts down the IC card by discontinuing the card clock signal and turning transistor 44 OFF (step S16). The microcontroller then converts the card balance data to binary coded decimal (BCD) form.

The next series of steps (an output routine shown in FIG. 3C) are to vocalize the data. First, the microcontroller 32 writes the address code of the beep tone to the MP 32A from which it is applied to the address input port 34A of the synthesizer circuit 34 (step S18). Then, in a step S19, two beep tones are output, separated by a 100 millisecond break. The two beep tones are generated in the following manner: The microcontroller 32 issues a strobe pulse to the strobe input terminal 34B of the synthesizer circuit 34, in response to which the synthesizer circuit causes a beep tone to be generated. The synthesizer circuit also responds by applying a busy signal to the microcontroller 32 and the microcontroller responds by waiting before issuing the next sound code. When a full beep tone has been sounded, the busy signal is removed. The microcontroller 32 delays 100 milliseconds so that there is a distinct pause between sounds, and then issues another strobe signal to cause another beep tone to be generated (accompanied by issuance of another busy signal), in the same manner the first beep tone was generated. The two beeps indicate to the user that valid data is about to be spoken.

The microcontroller waits for the end of the latest busy signal (step 20). At the end of the second busy signal, the microcontroller 32 again delays, this time for 500 milliseconds (step S21), and then reads the most significant digit from the BCD data stored in the RAM (step S22), goes to a lookup table to obtain the corresponding sound address code (step S23) and then writes this code to the AAP 32A so as to be applied to the synthesizer circuit 34 (step S24). The microcontroller 32 then issues a strobe signal to the synthesizer circuit (step S25) to start the vocalization. Meanwhile, in microcontroller 32 an internal memory pointer to the data digits is incremented to reference the next most significant digit to be vocalized (step S26). A determination is then made as to whether end of the data (the least significant digit) has been processed (step S27). If not, the process returns to step S20, and steps S20 to S27 are repeated until all digits have been vocalized. If the data includes a decimal point, it is represented by a single short beep. When the last of the digits has been vocalized, in a step S28, the beep code is reloaded into the AAP port 32A in the same manner as is discussed above with reference to step S18, and two strobe signals are issued at 100 millisecond intervals to produce two short beeps in the same manner as discussed above with reference to step S19. At this point, the user can release pressure from the button 24 to open the membrane switch 42.

Figure 3D:
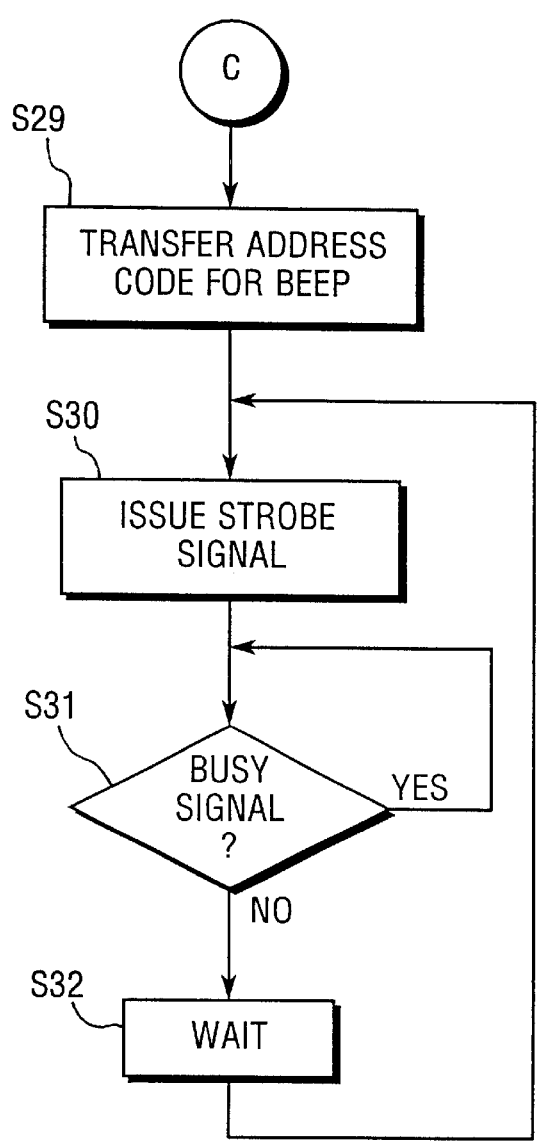
Figure 3C:
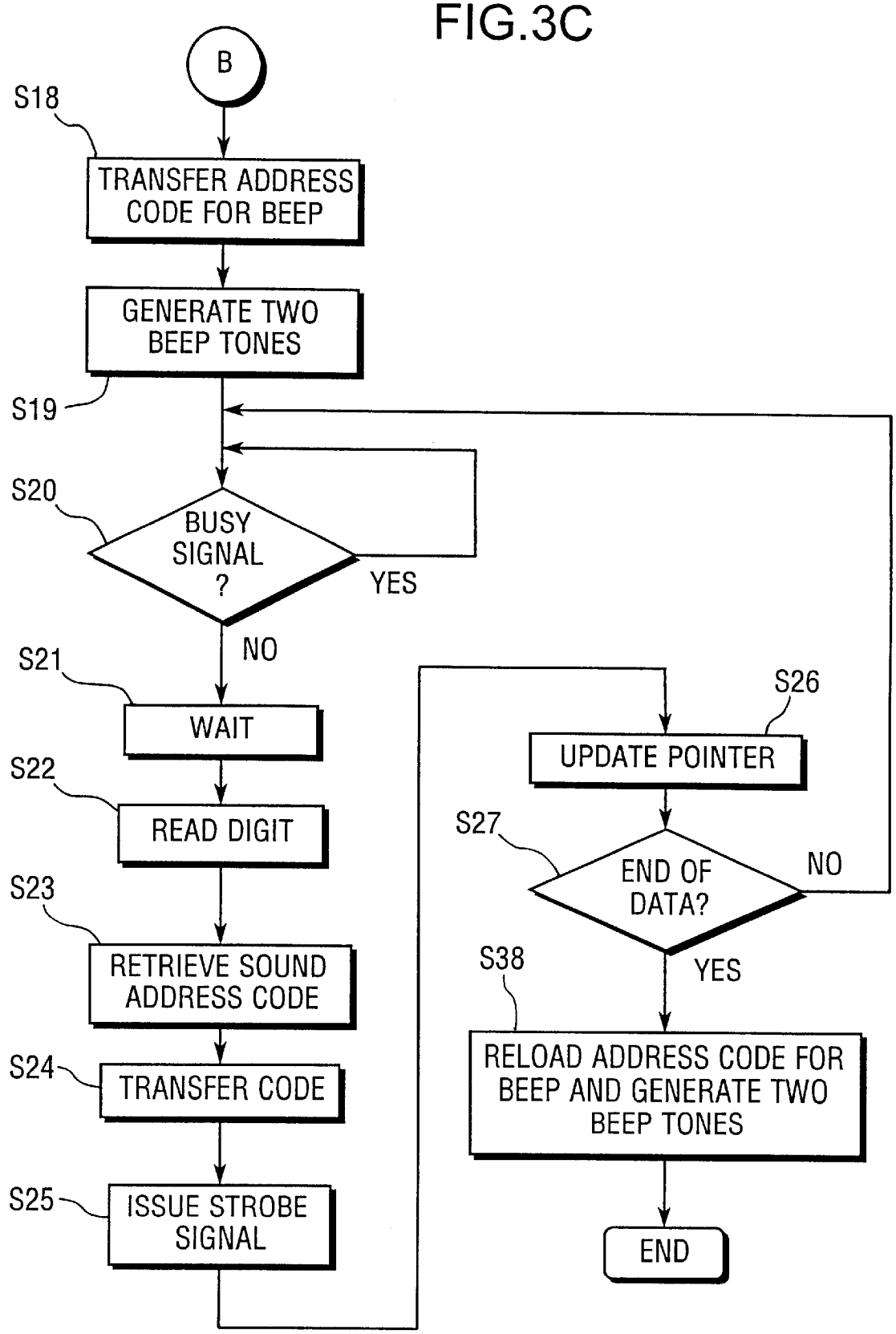

If some error in the operation has been detected, and stored as an error flag set in the RAM of the microcontroller 32, such as lack of a card, a non-functioning card, or a communication error (parity), then the microcontroller first performs step S12 as discussed above to discontinue the clock signal and power to the IC card, and then performs an error routine that is shown in FIG. 3D, to issue continuous beeps at 250 millisecond intervals. The different tempo of the beeps makes it easy for the user to distinguish an error signal from the start of valid data. The error signal remains active until the user releases pressure from the button 24.

The error routine as illustrated in FIG. 3D includes the following steps: The code for the beep tone is loaded into the AAP port 32A (step S29) in the same manner as is discussed above with reference to step S18. The strobe signal is then applied by the microcontroller 32 to the strobe input terminal 34B of the synthesizer circuit 34, in response to which the synthesizer circuit 34 produces a beep tone (step 30). The synthesizer circuit also responds by applying a busy signal to the microcontroller 32, causing the latter to wait before issuing the next sound code (step S31). When the full beep tone has been sounded, the busy signal is removed. The microcontroller then delays 250 milliseconds (step 32) and then the process returns to step S30 for production of another beep tone. The routine is repeated over and over to produce successive beeps until the user releases the button 24 to open the membrane switch 42 and thereby cuts off the power supply.

It will be understood that the above description of the present invention is susceptible to various modifications, changes, and adaptations, and the same are intended to be comprehended within the meaning and range of equivalents of the appended claims. For example, while the disclosed embodiment is adapted to read IC cards that store numerical data such as a monetary amount, the invention is not so limited and may easily be adapted to read IC cards that store nonmonetary and nonnumerical data. Moreover, while the disclosed embodiment reads IC cards which have microprocessors, the invention also is applicable to IC cards which do not, such as telephone cards which may have only EEPROMs. Further, while the disclosed embodiment is intended for sight impaired persons, a visual output like that provided in a conventional IC card reader, for use by those not visually impaired, may also be provided at minimal additional cost and with little if any additional space requirements in and on the case. The invention may be further useful to non-sight-impaired persons in low light conditions.

What is claimed is:

1. An IC card reader, comprising:
    a portable case having a form factor for fitting into a pocket, purse or wallet;
    a substrate in said case;
    receiving means on said substrate for receiving an IC card having financial data stored thereon;
    reading means on said substrate for reading the stored financial data;
    transforming means on said substrate for transforming the read financial data into a series of voice command codes;
    voice synthesis means, disposed on said substrate and responsive to the voice command codes, for producing a synthetic speech signal; and
    audio outputting means, disposed on said case and responsive to the synthetic speech signal, for outputting an audio synthesized speech signal corresponding to the stored financial data.

2. A portable IC card reader, comprising:
    a case having a form factor for fitting into a pocket, purse or wallet, and having receiving means for removably receiving an IC card;
    reading means in said case for reading binary data representing alpha-numeric information stored on the card;
    transforming means in said case for transforming the read binary data into a series of voice command codes;
    voice synthesis means, disposed in said case and responsive to the voice command codes, for producing a synthetic speech signal; and
    synthetic speech outputting means, mounted in said case and responsive to the synthetic speech signal, for outputting synthetic speech corresponding to the alpha-numeric information.

3. A portable IC card reader according to claim 2, further comprising electrical power supplying means for receiving a battery in said case for supplying electrical power.

4. A portable IC card reader according to claim 3, further comprising a switch for electrically connecting and disconnecting the battery.

5. A portable IC card reader according to claim 4, wherein the switch comprises a momentary-contact switch which is closed by manual pressure exerted from outside the case.

6. A portable IC card reader according to claim 2, wherein the case has a length of less than five inches, a width less than or equal to four inches, and a height less than or equal to one-half inch.

7. A portable IC card reader, comprising:

a case having a form factor for fitting into a pocket, purse or wallet, and having receiving means for removably receiving an IC card;

a microcontroller in said case for reading digital data representing alpha-numeric information stored on the card, and transforming the read digital data into a series of voice command codes;

a voice synthesizer circuit, disposed in said case and responsive to the voice command codes, for producing a synthetic speech signal;

an amplifier for amplifying the synthetic speech signal; and a transducer, mounted in said case and responsive to the amplified synthetic speech signal, for outputting an audio signal corresponding to the alpha-numeric information.

8. A portable IC card reader according to claim 7, further comprising means for receiving a battery in said case, and a switch exposed on a surface of said case and electrically connecting said battery to said microcontroller, said microcontroller being responsive to a closing of said switch to interrogate the card so that the data stored on the card is read into the microcontroller.

9. A portable IC card reader according to claim 7, wherein the audio signal is audible synthetic speech corresponding to the stored digital data representing alpha-numeric information.

10. A portable IC card reader according to claim 9, wherein, both before and after the synthetic speech signal, the voice synthesizer produces, and the transducer outputs, tones to indicate the beginning and end of the synthetic speech corresponding to the stored data.

* * * * *